US006952711B2

(12) United States Patent
Catherwood

(10) Patent No.: US 6,952,711 B2
(45) Date of Patent: Oct. 4, 2005

(54) MAXIMALLY NEGATIVE SIGNED FRACTIONAL NUMBER MULTIPLICATION

(75) Inventor: Michael I. Catherwood, Pepperell, MA (US)

(73) Assignee: Microchip Technology Incorporated, Chandler, AZ (US)

( * ) Notice: Subject to any disclaimer, the term of this patent is extended or adjusted under 35 U.S.C. 154(b) by 531 days.

(21) Appl. No.: 09/870,711

(22) Filed: Jun. 1, 2001

(65) Prior Publication Data

US 2002/0184286 A1 Dec. 5, 2002

(51) Int. Cl.[7] .................................................. G06F 7/52
(52) U.S. Cl. ...................................................... 708/625
(58) Field of Search ................................ 708/625–632; 798/632

(56) References Cited

U.S. PATENT DOCUMENTS

| | | | | |
|---|---|---|---|---|
| 3,771,146 | A | 11/1973 | Cottton et al. | 710/260 |
| 3,781,810 | A | 12/1973 | Downing | |
| 3,886,524 | A | 5/1975 | Appelt | 710/110 |
| 3,930,253 | A | 12/1975 | Maida | 340/347 |
| 4,025,771 | A | 5/1977 | Lynch et al. | 708/521 |
| 4,074,353 | A | 2/1978 | Woods et al. | 710/264 |
| 4,090,250 | A | 5/1978 | Carlson et al. | 712/234 |
| 4,323,981 | A | 4/1982 | Nakamura | 364/749 |
| 4,379,338 | A | 4/1983 | Nishitani et al. | 708/552 |
| 4,398,244 | A | 8/1983 | Chu et al. | |
| 4,408,274 | A | 10/1983 | Wheatley et al. | 364/200 |
| 4,451,885 | A | 5/1984 | Gerson et al. | 708/200 |
| 4,472,788 | A | 9/1984 | Yamazaki | |
| 4,481,576 | A | 11/1984 | Bicknell | |
| 4,488,252 | A | 12/1984 | Vassar | |
| 4,511,990 | A | 4/1985 | Hagiwara et al. | |
| 4,556,938 | A | 12/1985 | Parker et al. | |
| 4,615,005 | A | 9/1986 | Maejima et al. | 713/601 |

(Continued)

FOREIGN PATENT DOCUMENTS

| | | | |
|---|---|---|---|
| EP | 0 554 917 A2 | 8/1993 | G06F/9/26 |
| EP | 0 855 643 A1 | 7/1998 | G06F/9/30 |
| EP | 0 992 888 | 12/2000 | G06F/9/32 |
| EP | 0 992 889 | 12/2000 | G06F/9/32 |
| JP | 01037124 A | 2/1989 | H03M/001/82 |
| WO | 96/11443 | 4/1996 | G06F/15/78 |

OTHER PUBLICATIONS

SPARC, International, Inc., "The SPARC Architecture Manual", Version 9, pp. 137–299.

Free On–Line Dictionary of Computing (FOLDOC), http://wombat.doc.ic.ac.uk/foldoc/foldoc.cgi?query=program+counter.

(Continued)

*Primary Examiner*—D. H. Malzahn
(74) *Attorney, Agent, or Firm*—Baker Botts L.L.P.

(57) ABSTRACT

A method and processor for multiplying two maximally negative fractional numbers to produce a 32-bit result are provided. Operands are fetched from a source location for operation of a multiplication operation. Result outputs corresponding to a maximally negative result are detected. The detection of a maximally negative result indicates that the operands are two maximally negative fractional numbers. Maximally negative results are corrected to produce a maximally positive result. Result output are fractionally aligned and sign extended for accumulation in an accumulator.

28 Claims, 4 Drawing Sheets

U.S. PATENT DOCUMENTS 4,626,988 A 12/1986 George
4,709,324 A 11/1987 Kloker ....................... 364/200
4,730,248 A 3/1988 Watanabe et al.
4,742,479 A 5/1988 Kloker et al. ............... 364/746
4,768,149 A 8/1988 Konopik et al. ............ 364/200
4,779,191 A 10/1988 Greenblatt ..................... 711/2
4,782,457 A 11/1988 Cline
4,800,524 A 1/1989 Roesgen ..................... 364/900
4,807,172 A 2/1989 Nukiyama
4,829,420 A 5/1989 Stahle
4,829,460 A 5/1989 Ito
4,839,846 A 6/1989 Hirose et al.
4,841,468 A * 6/1989 Miller et al. ................ 708/625
4,872,128 A 10/1989 Shimizu
4,882,701 A 11/1989 Ishii
4,926,371 A * 5/1990 Vassiliadis et al. ......... 708/628
4,941,120 A 7/1990 Brown et al.
4,943,940 A 7/1990 New
4,945,507 A 7/1990 Ishida et al. ................ 708/530
4,959,776 A 9/1990 Deerfield et al.
4,977,533 A 12/1990 Miyabayashi et al.
4,984,213 A 1/1991 Abdoo et al.
5,007,020 A 4/1991 Inskeep
5,012,441 A 4/1991 Retter
5,032,986 A 7/1991 Pathak et al.
5,034,887 A 7/1991 Yasui et al. ................. 364/200
5,038,310 A 8/1991 Akagiri et al.
5,040,178 A 8/1991 Lindsay et al. ............ 371/21.5
5,056,004 A 10/1991 Ohde et al.
5,099,445 A 3/1992 Studor et al.
5,101,484 A 3/1992 Kohn
5,117,498 A 5/1992 Miller et al.
5,121,431 A * 6/1992 Wiener ....................... 713/174
5,122,981 A 6/1992 Taniguchi
5,155,823 A 10/1992 Tsue
5,177,373 A 1/1993 Nakamura .................. 307/265
5,197,023 A 3/1993 Nakayama
5,197,140 A 3/1993 Balmer
5,206,940 A 4/1993 Murakami et al.
5,212,662 A 5/1993 Cocanougher et al.
5,239,654 A 8/1993 Ing-Simmons et al. ..... 395/800
5,276,634 A 1/1994 Suzuki et al.
5,282,153 A 1/1994 Bartkowiak et al.
5,327,543 A 7/1994 Miura et al.
5,327,566 A 7/1994 Forsyth ...................... 395/775
5,375,080 A 12/1994 Davies .................... 364/736.5
5,379,240 A 1/1995 Byrne
5,386,563 A 1/1995 Thomas, deceased ....... 395/650
5,392,435 A 2/1995 Masui et al. ................ 395/725
5,418,976 A 5/1995 Iida ........................... 395/800
5,422,805 A * 6/1995 McIntyre et al. ........... 708/625
5,432,943 A 7/1995 Mitsuishi .................... 395/725
5,448,703 A 9/1995 Amini et al.
5,448,706 A 9/1995 Fleming et al.
5,450,027 A 9/1995 Gabara ........................ 326/98
5,463,749 A 10/1995 Wertheizer et al.
5,469,377 A 11/1995 Amano
5,471,600 A 11/1995 Nakamoto
5,497,340 A 3/1996 Uramoto et al.
5,499,380 A 3/1996 Iwata et al.
5,504,916 A 4/1996 Murakami et al. .......... 395/800
5,517,436 A 5/1996 Andreas et al. ............. 708/524
5,525,874 A 6/1996 Mallarapu et al. .......... 318/254
5,548,544 A 8/1996 Matheny et al.
5,561,384 A 10/1996 Reents et al. ............... 327/108
5,561,619 A 10/1996 Watanabe et al. ........ 364/736.5
5,564,028 A 10/1996 Swoboda et al. ........... 395/375
5,568,380 A 10/1996 Broadnax et al. ............. 700/79
5,568,412 A 10/1996 Han et al.
5,596,760 A 1/1997 Ueda
5,600,813 A 2/1997 Nakagawa et al.
5,611,061 A 3/1997 Yasuda ....................... 395/591
5,619,711 A 4/1997 Anderson
5,623,646 A 4/1997 Clarke ........................ 395/560
5,638,524 A 6/1997 Kiuchi et al.
5,642,516 A 6/1997 Hedayat et al.
5,642,518 A 6/1997 Kiyama et al. ............. 395/733
5,649,146 A 7/1997 Riou ..................... 395/421.07
5,651,121 A 7/1997 Davies
5,657,484 A 8/1997 Scarra
5,659,700 A 8/1997 Chen et al. ............ 395/421.07
5,682,339 A 10/1997 Tam
5,689,693 A 11/1997 White
5,694,350 A 12/1997 Wolrich et al.
5,696,711 A 12/1997 Makineni
5,701,493 A 12/1997 Jaggar ........................ 395/734
5,706,460 A 1/1998 Craig et al.
5,706,466 A 1/1998 Dockser ..................... 395/452
5,715,470 A 2/1998 Asano et al.
5,737,570 A 4/1998 Koch
5,740,095 A * 4/1998 Parant ........................ 708/628
5,740,419 A 4/1998 Potter
5,740,451 A 4/1998 Muraki et al. .............. 395/733
5,748,516 A 5/1998 Goddard et al.
5,748,970 A 5/1998 Miyaji et al. ............... 395/733
5,764,555 A 6/1998 McPherson et al. ... 364/748.03
5,765,216 A 6/1998 Weng et al. ................ 711/214
5,765,218 A 6/1998 Weng et al. ................ 711/219
5,774,711 A 6/1998 Henry et al.
5,778,237 A 7/1998 Yamamoto et al. ......... 713/322
5,778,416 A 7/1998 Harrison et al.
5,790,443 A 8/1998 Shen et al.
5,808,926 A 9/1998 Gorshtein et al.
5,812,439 A 9/1998 Hansen
5,812,868 A 9/1998 Moyer et al. .......... 395/800.23
5,815,693 A 9/1998 McDermott et al. ........ 713/501
5,825,730 A 10/1998 Nishida et al.
5,826,072 A 10/1998 Knapp et al. ............... 395/567
5,826,096 A 10/1998 Baxter
5,828,875 A 10/1998 Halvarsson et al.
5,862,065 A 1/1999 Muthusamy
5,867,726 A 2/1999 Ohsuga et al. ......... 395/800.32
5,875,342 A 2/1999 Temple ....................... 395/733
5,880,984 A 3/1999 Burchfiel et al.
5,892,697 A 4/1999 Brakefield
5,892,699 A 4/1999 Duncan et al.
5,894,428 A 4/1999 Harada
5,900,683 A 5/1999 Rinehart et al. ............ 307/126
5,909,385 A 6/1999 Nishiyama et al.
5,917,741 A 6/1999 Ng
5,918,252 A 6/1999 Chen et al. ................. 711/217
5,930,159 A 7/1999 Wong
5,930,503 A 7/1999 Drees
5,936,870 A 8/1999 Im ............................ 708/552
5,937,199 A 8/1999 Temple ....................... 395/335
5,938,759 A 8/1999 Kamijo
5,941,940 A 8/1999 Prasad et al.
5,943,249 A 8/1999 Handlogten
5,944,816 A 8/1999 Dutton et al. ............... 712/215
5,951,627 A 9/1999 Kiamilev et al.
5,951,679 A 9/1999 Anderson et al.
5,974,549 A 10/1999 Golan ........................ 713/200
5,978,825 A 11/1999 Divine et al. ............... 708/525
5,983,333 A 11/1999 Kolagotla et al. .......... 711/219
5,991,787 A 11/1999 Abel et al.
5,991,868 A 11/1999 Kamiyama et al. ........... 712/32
5,996,067 A 11/1999 White
6,009,454 A 12/1999 Dummermuth
6,014,723 A 1/2000 Tremblay et al.
6,018,757 A 1/2000 Wong ......................... 708/525
6,026,489 A 2/2000 Wachi et al.

| | | | | |
|---|---|---|---|---|
| 6,044,392 A | | 3/2000 | Anderson et al. | |
| 6,044,434 A | | 3/2000 | Oliver | |
| 6,049,858 A | | 4/2000 | Kolagotla et al. | 711/217 |
| 6,055,619 A | | 4/2000 | North et al. | 713/36 |
| 6,058,409 A | | 5/2000 | Kozaki et al. | |
| 6,058,410 A | | 5/2000 | Sharangpani | |
| 6,058,464 A | | 5/2000 | Taylor | |
| 6,061,711 A | | 5/2000 | Song et al. | 709/108 |
| 6,061,780 A | | 5/2000 | Shippey et al. | |
| 6,061,783 A | | 5/2000 | Harriman | 712/224 |
| 6,076,154 A | | 6/2000 | Van Eijndhoven et al. | |
| 6,084,880 A | | 7/2000 | Bailey et al. | 370/395 |
| 6,101,521 A | | 8/2000 | Kosiec | |
| 6,101,599 A | | 8/2000 | Wright et al. | 712/228 |
| 6,115,732 A | | 9/2000 | Oberman et al. | |
| 6,128,728 A | | 10/2000 | Dowling | |
| 6,134,574 A | | 10/2000 | Oberman et al. | |
| 6,144,980 A | * | 11/2000 | Oberman | 708/627 |
| 6,145,049 A | | 11/2000 | Wong | |
| 6,181,151 B1 | | 1/2001 | Wasson | 324/765 |
| 6,202,163 B1 | | 3/2001 | Gabzdyl et al. | 713/324 |
| 6,205,467 B1 | | 3/2001 | Lambrecht et al. | 718/108 |
| 6,209,086 B1 | | 3/2001 | Chi et al. | 712/244 |
| 6,243,786 B1 | | 6/2001 | Huang et al. | 710/262 |
| 6,243,804 B1 | | 6/2001 | Cheng | 712/228 |
| 6,260,162 B1 | | 7/2001 | Typaldos et al. | 714/55 |
| 6,282,637 B1 | | 8/2001 | Chan et al. | 712/223 |
| 6,292,866 B1 | | 9/2001 | Zaiki et al. | 710/264 |
| 6,295,574 B1 | | 9/2001 | MacDonald | 710/261 |
| 6,315,200 B1 | | 11/2001 | Silverbrook et al. | 235/454 |
| 6,356,970 B1 | | 3/2002 | Killian et al. | 710/269 |
| 6,377,619 B1 | | 4/2002 | Denk et al. | 708/322 |
| 6,397,318 B1 | | 5/2002 | Peh | 711/220 |
| 6,412,081 B1 | | 6/2002 | Koscal et al. | 714/34 |
| 6,487,654 B2 | | 11/2002 | Dowling | 712/244 |
| 6,523,108 B1 | | 2/2003 | James et al. | 712/224 |
| 6,564,238 B1 | | 5/2003 | Kim et al. | 708/513 |
| 6,633,970 B1 | | 10/2003 | Clift et al. | 712/217 |
| 6,658,578 B1 | | 12/2003 | Laurenti et al. | 713/324 |
| 6,681,280 B1 | | 1/2004 | Miyake et al. | 710/261 |
| 6,694,398 B1 | | 2/2004 | Zhao et al. | 710/260 |
| 6,728,856 B2 | | 4/2004 | Grosbach et al. | 711/202 |
| 6,751,742 B1 | | 6/2004 | Duhault et al. | 713/323 |
| 6,763,478 B1 | | 7/2004 | Bui | 713/600 |
| 2002/0194466 A1 | | 12/2002 | Catherwood et al. | 712/241 |
| 2003/0093656 A1 | | 5/2003 | Masse et al. | 712/241 |

OTHER PUBLICATIONS

Moon B I et al.: "A 32–bit RISC Microprocessor with DSP Functionality: Rapid Prototyping" IEICE Transactions on Fundamentals of Electronics, Communications and Computer Sciences, Institute of Electronics Information and Comm. Eng. Tokyo, JP, vol. E84–A No. 5, pp. 1339–1347, XP001060025 ISSN: 0916–8508, May 2001.

Turley J: "Balancing Conflicting Requirements When Mixing RISC, DSPs" Computer Design, Pennwell Publ. Littleton, Massachusetts, IS, vol. 37, No. 10, pp. 46, 48, 50–53, XP000860706 ISSN:0010–4566, Oct. 1998.

Levy M: "Microprocessor and DSP Technologies Unite for Embedded Applications" EDN Electrical Design News, Cahners Publishing Co., Newtown Massachusetts, US, no. Europe, pp. 73–74, 76, 78–80, XP000779113 ISSN: 0012–7515, Mar. 2, 1998.

Intel, Pentium Processor Family Developer's Manual, vol. 3: Architecture and Programming Manual, , pp. 3–1, 3–2, 3–15, 14–1 to 14–30, 18–7, and 25–289 to 25–292, 1995.

Intel, Embedded Intel486 Processor Family Developer's Manual, pp. 2–2, 3–17, 3–37, 4–5, 4–6, 10–1 to 10–12, 12–1 to 12–10, Oct. 1997.

Moore, M "Z80 Family Interrupt Structure". Barleywood (online), retrieved from the Internet <URL: http://www-.gaby.de/z80/1653.htm>, 1997.

PCT Search Report based on PCT/US02/16706, 6 pages, Sep. 27, 2002.

PCT Search Report based on PCT/US02/16705, 7 pages, Sep. 9, 2002.

PCT Search Report based on PCT/US02/16921, 4 pages, Oct. 18, 2002.

SPARC, International, Inc., "The SPARC Architecture Manual", Version 6, pp.1–303, 1992.

Weaver, et al., SPARC International, Inc. "The SPARC Architecture Manual", Version 9, pp. xiv, 137, 146–147, 200–204, 221–222, 234–236, 299, 1994–2000.

Free On–Line Dictionary of Computing (FOLDOC). http://wombat.doc.ic.ac.uk/foldoc/ Search term: program counter, 1 page, 1995.

* cited by examiner

MAXIMALLY NEGATIVE SIGNED FRACTIONAL NUMBER MULTIPLICATION

BACKGROUND OF THE INVENTION

1. Field of the Invention

The present invention relates to systems and methods for instruction processing and, more particularly, to systems and methods for performing multiplication processing of two maximally negative signed fractional numbers.

2. Description of Prior Art

Processors, including microprocessors, digital signal processors and microcontrollers, operate by running software programs that are embodied in one or more series of instructions stored in a memory. The processors run the software by fetching instructions from the series of instructions, decoding the instructions and executing the instructions. Processors, including digital signal processors, are conventionally adept at processing instructions that perform mathematical computations on positive fractional numbers specified as a data word. For example, some processors are adept at performing multiplicative operations, such as a 16-bit positive fractional number multiplied by another 16-bit fractional number. In general, multiplicative operations using 16-bit positive and negative fractional numbers produce a 32-bit result. The multiplication of two maximally negative 16-bit numbers produces a 33-bit result. The additional bit is required to represent the integer portion of the result. This type of multiplication employing two maximally negative fractional numbers requires an additional bit to represent the result of multiplying the two multiplied maximally negative 16-bit fractional numbers as well as a 17-bit DSP multiplier to produce the result. The utilization of a 17-bit DSP multiplier in a processor is expensive, while the utilization of a 16-bit DSP multiplier produces inaccurate results.

There is a need for a new method of multiplying two maximally negative fractional numbers using a 16-bit DSP multiplier to produce a 32-bit result. There is a further need for a new method of producing a result of two multiplied maximally negative fractional numbers represented correctly with 32-bits. There is also a need for a new method of identifying when two maximally negative fractional numbers are multiplied.

SUMMARY OF THE INVENTION

According to embodiments of the present invention, methods and processors for multiplying two maximally negative fractional numbers to produce a 32-bit result are provided. This type of multiplication may be executed using a 16-bit DSP multiplier and produce a 32-bit result. The identification of a multiplication operation employing two maximally negative 16-bit fractional numbers enables manipulation of processing to correct a maximally negative result and produce a maximally positive result. Negate logic with a control block examines results produced by the 16-bit DSP multiplier and determines whether there are a combination of bits signifying the multiplication of two maximally negative 16-bit fractional numbers. The determination of the required bit combination initiates negate processing for correcting the results. This type of multiplication operation utilizes a 16-bit DSP multiplier to produce accurate 32-bit results when the multiplication of two maximally negative fractional numbers occur as well as reduces the overall cost of the processor.

According to an embodiment of the present invention, a method of multiplying two maximally negative fractional numbers to produce a 32-bit result includes fetching operands from a source location and performing a multiplication operation on the operands. The method also includes detecting that a result output of the multiplication operation corresponds to a maximally negative result. A maximally negative result indicates that the operands are two maximally negative fractional numbers. The method also includes correcting the result output to produce a maximally positive result output.

According to an embodiment of the present invention, a method of multiplying two maximally negative fractional numbers to produce a 32-bit result includes examining bits in a set of bits representing the result output to determining that the bits in the set of bits representing the result have a particular bit combination. The bit of particular importance include the thirtieth and thirty-first bits in the set of bits representing the result output and have a value of one and zero respectively.

According to an embodiment of the present invention, a method of multiplying two maximally negative fractional numbers to produce a 32-bit result includes generating a control signal. The control signal modifies a negate signal for controlling the performance of a two's compliment on the result output to produce a maximally positive result output. The maximally positive result output is accumulated in an accumulator.

According to an embodiment of the present invention, a method of multiplying two maximally negative fractional numbers to produce a 32-bit result includes fractionally aligning the result output. Fractional alignment includes shifting a set of bits representing the result output to the left by one bit to discard the most significant bit of the set of bits representing the result output and insert a zero as the least significant bit of the set of bits representing the result output.

According to an embodiment of the present invention, a method of multiplying two maximally negative fractional numbers to produce a 32-bit result includes sign extending the output result. Sign extension includes extending the result output from a 32-bit result to a 40-bit result.

BRIEF DESCRIPTION OF THE DRAWINGS

The above described features and advantages of the present invention will be more fully appreciated with reference to the detailed description and appended figures in which.

DETAILED DESCRIPTION OF THE INVENTION

According to embodiments of the present invention, methods and processors for multiplying two maximally negative fractional numbers to produce a 32-bit result are provided. This type of multiplication may be executed using a 16-bit DSP multiplier and produce a 32-bit result. The identification of a multiplication operation employing two maximally negative 16-bit fractional numbers enables manipulation of processing to correct a maximally negative result and produce a maximally positive result. Negate logic with a control block examines results produced by the 16-bit DSP multiplier and determines whether there are a combination of bits signifying the multiplication of two to maximally negative 16-bit fractional numbers. The determination of the required bit combination initiates negate processing for correcting the results. This type of multiplication operation utilizes a 16-bit DSP multiplier to produce accurate 32-bit results when the multiplication of two maximally negative fractional numbers occur as well as reduces the overall cost of the processor.

Figure 1:
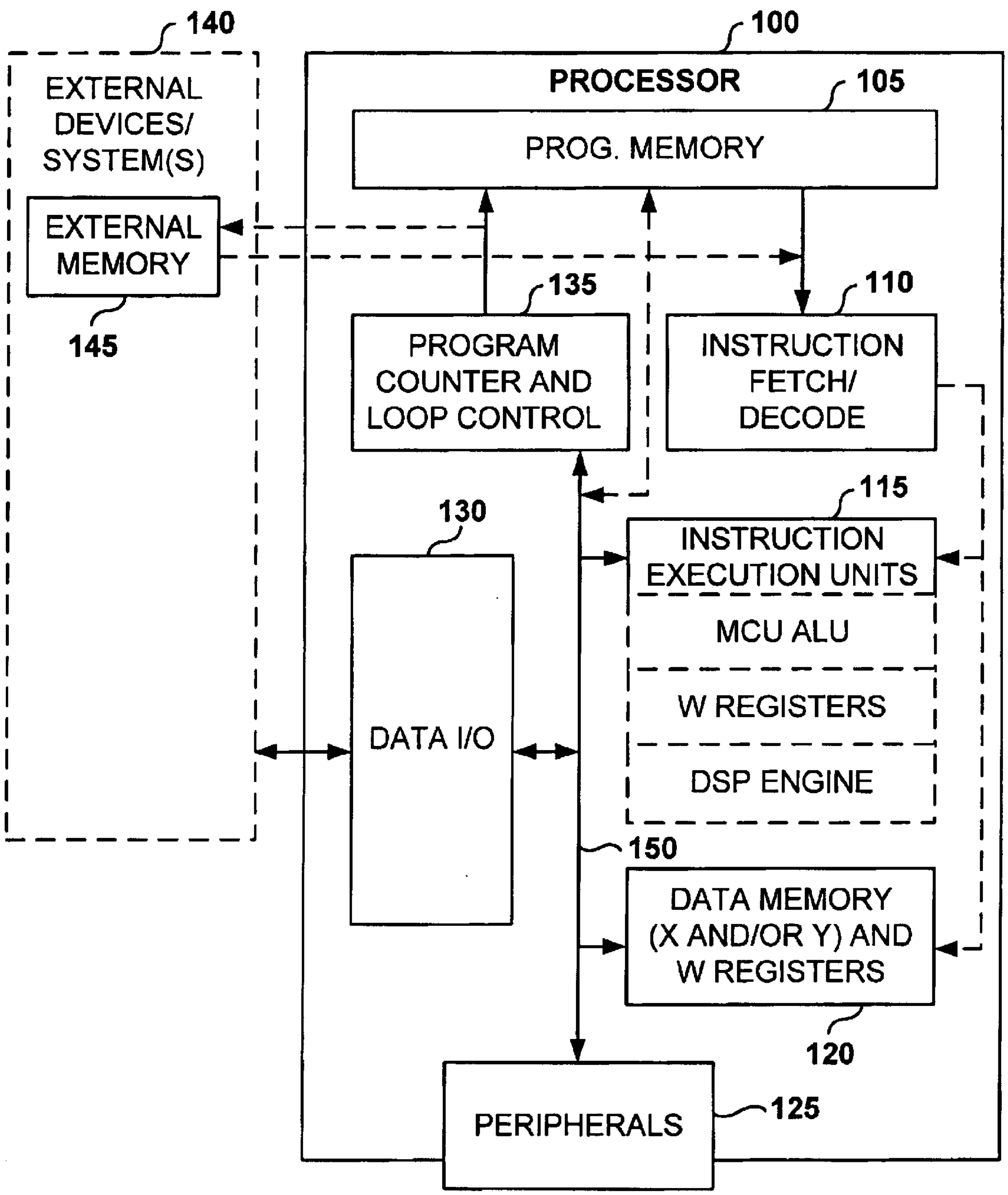
FIG. 1 depicts a functional block diagram of an embodiment of a processor chip within which embodiments of the present invention may find application.
Figure 2:
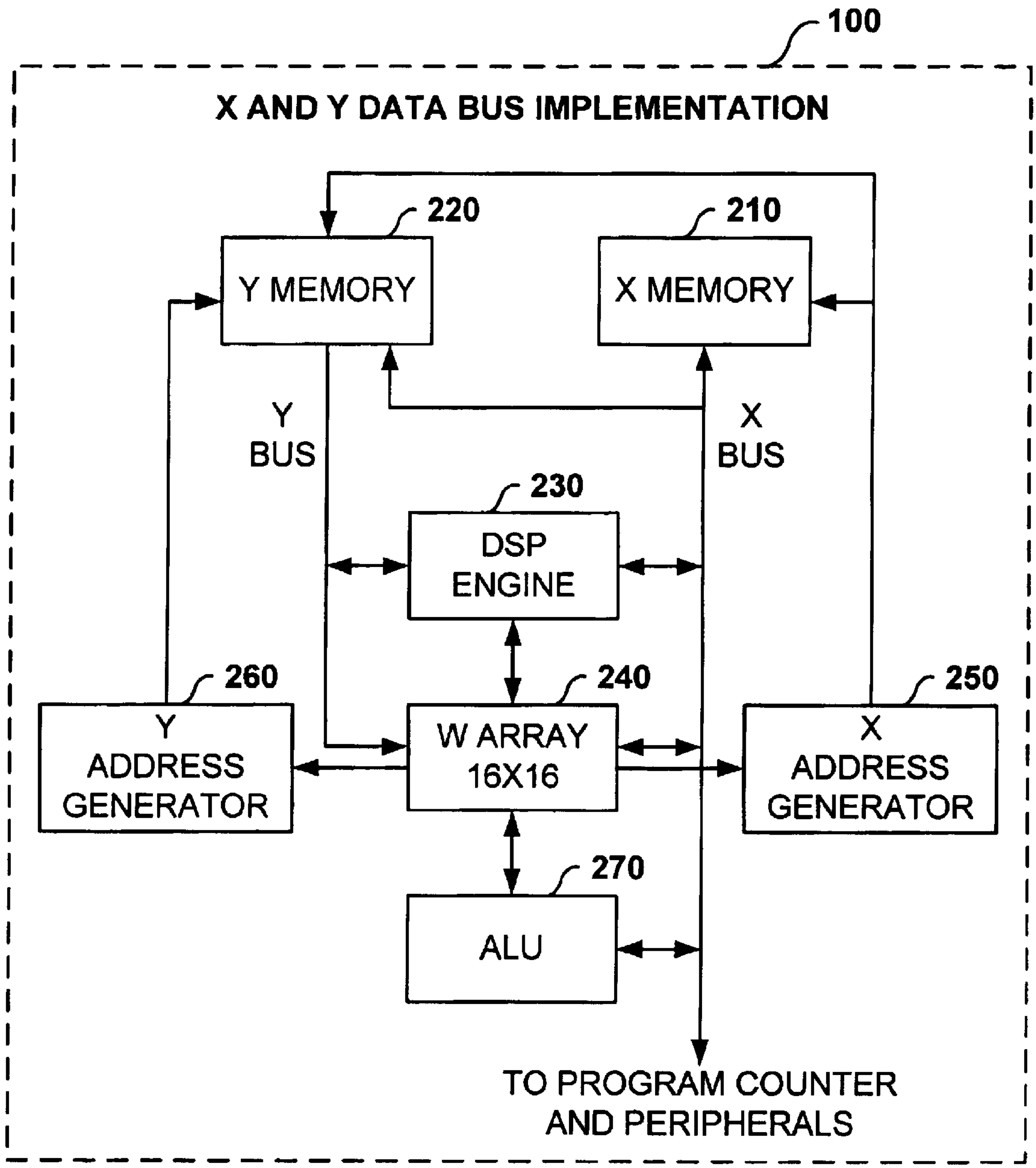
FIG. 2 depicts a functional block diagram of a data busing scheme for use in a processor, which has a microcontroller and a digital signal processing engine, within which embodiments of the present invention may find application.

In order to describe embodiments of multiplying two maximally negative fractional numbers, an overview of pertinent processor elements is first presented with reference to FIGS. 1 and 2. The multiplication of two maximally negative fractional numbers is then described more particularly with reference to FIGS. 3–4.

Overview of Processor Elements

FIG. 1 depicts a functional block diagram of an embodiment of a processor chip within which the present invention may find application. Referring to FIG. 1, a processor 100 is coupled to external devices/systems 140. The processor 100 may be any type of processor including, for example, a digital signal processor (DSP), a microprocessor, a microcontroller or combinations thereof. The external devices 140 may be any type of systems or devices including input/output devices such as keyboards, displays, speakers, microphones, memory, or other systems which may or may not include processors. Moreover, the processor 100 and the external devices 140 may together comprise a stand alone system.

The processor 100 includes a program memory 105, an instruction fetch/decode unit 110, instruction execution units 115, data memory and registers 120, peripherals 125, data I/O 130, and a program counter and loop control unit 135. The bus 150, which may include one or more common buses, communicates data between the units as shown.

The program memory 105 stores software embodied in program instructions for execution by the processor 100. The program memory 105 may comprise any type of nonvolatile memory such as a read only memory (ROM), a programmable read only memory (PROM), an electrically programmable or an electrically programmable and erasable read only memory (EPROM or EEPROM) or flash memory. In addition, the program memory 105 may be supplemented with external nonvolatile memory 145 as shown to increase the complexity of software available to the processor 100. Alternatively, the program memory may be volatile memory which receives program instructions from, for example, an external non-volatile memory 145. When the program memory 105 is nonvolatile memory, the program memory may be programmed at the time of manufacturing the processor 100 or prior to or during implementation of the processor 100 within a system. In the latter scenario, the processor 100 may be programmed through a process called in-line serial programming.

The instruction fetch/decode unit 110 is coupled to the program memory 105, the instruction execution units 115 and the data memory 120. Coupled to the program memory 105 and the bus 150 is the program counter and loop control unit 135. The instruction fetch/decode unit 110 fetches the instructions from the program memory 105 specified by the address value contained in the program counter 135. The instruction fetch/decode unit 110 then decodes the fetched instructions and sends the decoded instructions to the appropriate execution unit 115. The instruction fetch/decode unit 110 may also send operand information including addresses of data to the data memory 120 and to functional elements that access the registers.

The program counter and loop control unit 135 includes a program counter register (not shown) which stores an address of the next instruction to be fetched. During normal instruction processing, the program counter register may be incremented to cause sequential instructions to be fetched. Alternatively, the program counter value may be altered by loading a new value into it via the bus 150. The new value may be derived based on decoding and executing a flow control instruction such as, for example, a branch instruction. In addition, the loop control portion of the program counter and loop control unit 135 may be used to provide repeat instruction processing and repeat loop control as further described below.

The instruction execution units 115 receive the decoded mathematical instructions from the instruction fetch/decode unit 110 and thereafter execute the decoded mathematical instructions. As part of this process, the execution units may retrieve a set of source operands via the bus 150 from data memory and registers 120. During instruction processing, such as mathematical operation instructions, the set of source operands may be fetched from data memory and registers 120 as specified in the mathematical operation instructions. The set of set of source operands may be transferred from the data memory and registers 120 to registers prior to delivery to the execution units for processing. Alternatively, the set of source operands may be delivered directly from the data memory and registers 120 to the execution units for processing. Execution units may also produce outputs to registers and/or the data memory 120. The execution units may include an arithmetic logic unit (ALU) such as those typically found in a microcontroller. The execution units may also include a digital signal processing engine including a multiply and accumulate unit (MAC), a floating point processor, an integer processor or any other convenient execution unit. A preferred embodiment of the execution units and their interaction with the bus 150, which may include one or more buses, is presented in more detail below with reference to FIG. 2.

The data memory and registers 120 are volatile memory and are used to store data used and generated by the execution units. The data memory 120 and program memory 105 are preferably separate memories for storing data and program instructions respectively. This format is known generally as a Harvard architecture. It is noted, however, that according to the present invention, the architecture may be a Von-Neuman architecture or a modified Harvard architecture which permits the use of some program space for data space. A dotted line is shown, for example, connecting the program memory 110 to the bus 150. This path may include logic for aligning data reads from program space such as, for example, during table reads from program space to data memory 120.

Referring again to FIG. 1, a plurality of peripherals 125 on the processor may be coupled to the bus 150. The peripherals may include, for example, analog to digital converters, timers, bus interfaces having protocols such as, for example, the controller area network (CAN) protocol or the Universal Serial Bus (USB) protocol and other peripherals. The peripherals exchange data over the bus 150 with the other units.

The data I/O unit 130 may include transceivers and other logic for interfacing with the external devices/systems 140. The data I/O unit 130 may further include functionality to permit in circuit serial programming of the Program memory through the data I/O unit 130.

FIG. 2 depicts a functional block diagram of a data busing scheme for use in a processor 100, such as that shown in FIG. 1, which has an integrated microcontroller arithmetic logic unit (ALU) 270 and a digital signal processing (DSP) engine 230. This configuration may be used to integrate DSP functionality to an existing microcontroller core. Referring to FIG. 2, the data memory 120 of FIG. 1 is implemented as two separate memories: an X-memory 210 and a Y-memory 220, each being respectively addressable by an X-address generator 250 and a Y-address generator 260. The X-address generator may also permit addressing the Y-memory space thus making the data space appear like a single contiguous memory space when addressed from the X address generator. The bus 150 may be implemented as two buses, one for each of the X and Y memory, to permit simultaneous fetching of data from the X and Y memories.

The W registers 240 are general purpose address and/or data registers. The DSP engine 230 is coupled to both the X and Y memory buses and to the W registers 240. The DSP engine 230 may simultaneously fetch data from each X and Y memory, execute instructions which operate on the simultaneously fetched date write the result to an accumulator (not shown) and write a prior result to X or Y memory or to the W registers 240 within a single processor cycle.

In one embodiment, the ALU 270 may be coupled only to the X memory bus and may only fetch data from the X bus. However, the X and Y memories 210 and 220 may be addressed as a single memory space by the X address generator in order to make the data memory segregation transparent to the ALU 270. The memory locations within the X and Y memories may be addressed by values stored in the W registers 240.

Any processor clocking scheme may be implemented for fetching and executing instructions. A specific example follows, however, to illustrate an embodiment of the present invention. Each instruction cycle is comprised of four Q clock cycles Q1–Q4. The four phase Q cycles provide timing signals to coordinate the decode, read, process data and write data portions of each instruction cycle.

According to one embodiment of the processor 100, the processor 100 concurrently performs two operations—it fetches the next instruction and executes the present instruction. Accordingly, the two processes occur simultaneously. The following sequence of events may comprise, for example, the fetch instruction cycle:

Q1: Fetch Instruction

Q2: Fetch Instruction

Q3: Fetch Instruction

Q4: Latch. Instruction into prefetch register, Increment PC

The following sequence of events may comprise, for example, the execute instruction cycle for a single operand instruction:

Q1: latch instruction into IR, decode and determine addresses of operand data Q2: fetch operand Q3: execute function specified by instruction and calculate destination address for data Q4: write result to destination The following sequence of events may comprise, for example, the execute instruction cycle for a dual operand instruction using a data pre-fetch mechanism. These instructions pre-fetch the dual operands simultaneously from the X and Y data memories and store them into registers specified in the instruction. They simultaneously allow instruction execution on the operands fetched during the previous cycle.

Figure 3:
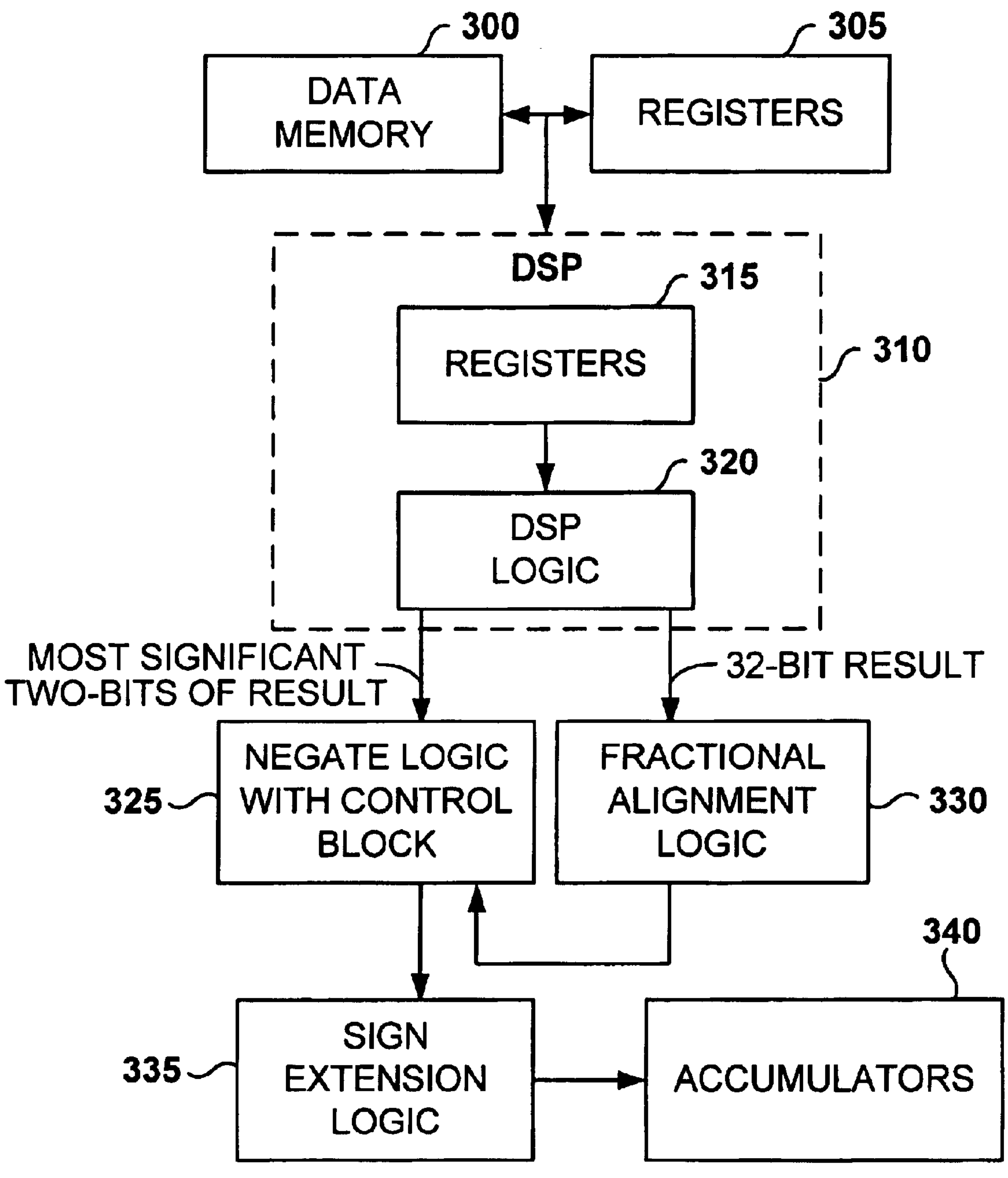
FIG. 3 depicts a functional block diagram of a processor logic configuration for multiplying two maximally negative 16-bit fractional numbers according to embodiments of the present invention.

Q1: latch instruction into IR, decode and determine addresses of operand data Q2: pre-fetch operands into specified registers, execute operation in instruction Q3: execute operation in instruction, calculate destination address for data Q4: complete execution, write result to destination Maximally Negative Fractional Number Multiplication FIG. 3 depicts a functional block diagram of a processor for multiplying two maximally negative fractional numbers to produce a 32-bit maximally positive fractional result according to an embodiment of the present invention. Referring to FIG. 3, the processor includes data memory 300 for storing data, such as two maximally negative fractional operands, used and generated by the processor. The processor also includes registers 305 for containing data that the processor generates and employs during processing mathematical operation instructions. The registers 305 may include a set of 16-bit W registers defined for mathematical operation instructions. The set of W registers may contain data including an operand and an effective address of an operand in data memory 300. The effective address of an operand in data memory 300 can be specified as an address or an address plus an offset. The processor also includes DSP unit 310, negate logic 325, fractional alignment logic 330, sign extension logic 335 and accumulators 340.

The DSP unit 310 can include registers 315 that receive operands from the registers 305 and the data memory 300. The DSP unit 310 includes DSP logic 320, which can receive inputs from the registers 315 and produces a 32-bit maximally negative result output to the fractional alignment logic 330 and the two most significant bits of the maximally negative result output to the negate control logic with control block 325. The DSP logic 320 includes a 16-bit multiplier that executes multiplicative and logic operations on operands fetched from the registers 305 and the data memory 300.

DSP logic 320 is activated upon the execution of mathematical operation instructions. In this regard, when a mathematical operation instruction is executed control signals cause the DSP unit to fetch operands from the registers 305 and the data memory 300. The control signals also cause the DSP logic 320 to operate on the fetched operands to produce result outputs in accordance with the instruction. The result outputs depend upon the instruction executed and the source operands. The result outputs may correspond to a maximally negative result output. The production of a maximally negative result output is based on the multiplication of two maximally negative numbers, such as $-1*-1$. After generating the result outputs, the DSP unit 310 writes the result outputs into the correct registers 305, data memory 300, and accumulators 340.

The fractional alignment logic 330 can receive result outputs produced by DSP unit 310 and produces modified result outputs. The result outputs may be 32-bits in length. The 32-bit representation of result outputs are shifted in the direction of the most significant bit by one bit to discard the most significant bit, while a zero is shifted/inserted in as the least significant bit to produce the modified result outputs.

Negate logic 325 can receive modified result outputs and the two most significant bits of bits representing result outputs as well as produce a maximally positive result output. Negate logic 325 includes a control block which can detect whether result outputs correspond to maximally negative results to generate a control signal to modify a negate control signal. The modification of the negate control signal enables negate logic 325 to correct maximally negative results to produce maximally positive results. The detection of a maximally negative result indicates that the operands operated on during the multiplication operation that produces the maximally negative result are two maximally negative fractional numbers, such as −1*−1.

The control block of the negate logic 325 examines the two most significant bits of the bits representing the result output and determines whether the two most significant bits in the set of bits representing the result output have a particular bit combination. The two most significant bits in the set of bits examined are the thirtieth and thirty-first bits for the set of bits representing the result output. Upon determining that the thirtieth and thirty-first bits are one and zero respectively, the control block of the negate logic 325 generates a control signal to modify a negate control signal generated by negate logic 325. The modified negate signals causes negate logic to preform a two's compliment operation on the result output correcting the maximally negative result output to a maximally positive result output. The error introduce by correction of the maximally negative result output is nominal, and more, specifically one least significant bit of the result output.

Sign extension logic 335 receives result outputs, including maximally positive result outputs, and produces sign extended result outputs. Result outputs are extended from a length of 32-bits to a length of 40-bits. Accumulators 340 accumulate result outputs that have been sign extended by sign extension logic 335. The Accumulators may be two 40-bit accumulators.

Figure 4:
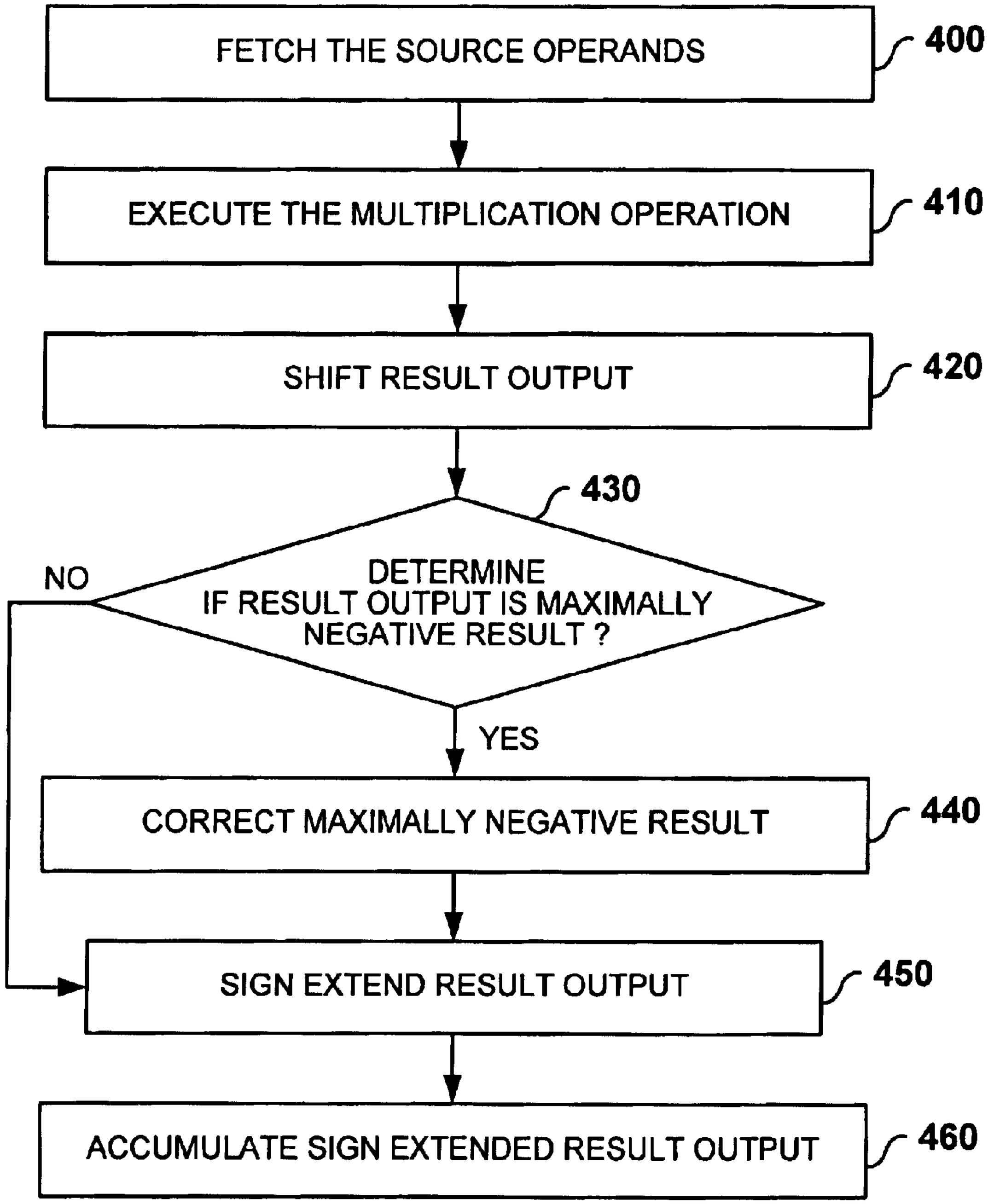
FIG. 4 depicts a method of multiplying two maximally negative 16-bit fractional numbers according to embodiments of the present invention.

FIG. 4 depicts a method of multiplying two maximally negative fractional numbers, such as −1*−1, to produce a 32-bit maximally positive fractional result and is best understood when viewed in combination with FIG. 3. Referring to FIG. 4, in step 400, a DSP multiplier 320 of a DSP unit 310 for a processor fetches operands from source locations. In the embodiment of FIG. 4, one operand is fetched from data memory 300, while the other operand is fetched from a register 305. Each of the operands may be a maximally negative fractional number. In step 410, the DSP multiplier 320 of the processor may execute a multiplication operation using the operands to produce a result output from the DSP unit 310. The result output may correspond to a maximally negative result. Maximally negative results are produce when two maximally negative numbers, such as −1, are multiplied.

In step 420, fractional alignment logic 330 shifts result output produced by DSP unit 310 in the direction of the most significant bit in a set of bit representing the result output and inserts a zero at the least significant bit in the set of bits representing the result output. In step 430, negate logic receives a modified result output produced by factional alignment logic 330 and the two most significant bits of a set of bits representing the result output produced by DSP unit 310. Negate control logic 325 determines whether the result output corresponds to a maximally negative result. If the result output corresponds to a maximally negative result the method proceeds to step 440, otherwise the method proceeds to step 450. In step 440, the result output is corrected from a maximally negative result to a maximally positive result. In the FIG. 4 embodiment, in step 450, the result output is sign extended by sign extension logic 335. One having skill in the art would recognize that the result output may be sign extended at any point after step 420. In step 460, an accumulator accumulates the sign extended result output.

While specific embodiments of the present invention have been illustrated and described, it will be understood by those having ordinary skill in the art that changes may be made to those embodiments without departing from the spirit and scope of the invention.

What is claimed is:

1. A method of multiplying two maximally negative fractional numbers to produce a 32-bit result, comprising:

fetching operands from a source location;

performing a multiplication operation on the operands; and detecting that a result output of the multiplication operation corresponds to a maximally negative result;

wherein the maximally negative result indicates that the operands are two maximally negative fractional numbers.

2. The method according to claim 1, further comprising the step of correcting the result output to produce a maximally positive result output.

3. The method according to claim 2, wherein the step of detecting that the result output of the multiplication operation corresponds to a maximally negative result includes the step of examining bits in a set of bits representing the result output.

4. The method according to claim 3, wherein the step of detecting that the result output of the multiplication operation corresponds to a maximally negative result includes the step of determining that the bits in the set of bits representing the result have a particular bit combination.

5. The method according to claim 4, wherein the bits in the set of bits are the two most significant bits in the set of bits representing the result output.

6. The method according to claim 4, wherein the particular bit combination for the bits in the set of bits representing the result output is one and zero respectively.

7. The method according to claim 2, wherein the step of correcting the result to produce a maximally positive result includes the step of generating a control signal.

8. The method according to claim 7, wherein the step of correcting the result to produce a maximally positive result includes the step of modifying a negate control signal based on the control signal.

9. The method according to claim 8, wherein the step of correcting the result to produce a maximally positive result includes the step of performing a two's compliment on the result output.

10. The method according to claim 9, further comprising:

accumulating the maximally positive result output to an accumulator.

11. The method according to claim 1, further comprising the step of fractionally aligning the result output.

12. The method according to claim 11, wherein the step of fractionally aligning the result output includes the step of shifting a set of bits representing the result output to the left by one bit to discard the most significant bit of the set of bits representing the result output and insert a zero as the least significant bit of the set of bits representing the result output.

13. The method according to claim 1, further comprising the step of sign extending the output result.

14. The method according to claim 13, wherein the result output is extended from a 32-bit result to a 40-bit result.

15. A processor for multiplication operation instruction processing, comprising:

a DSP unit operable to:

fetch operands from a source location;

perform a multiplication operation on the operands; and a control block operable to detect that a result output of the multiplication operation corresponds to a maximally negative result;

wherein the maximally negative result indicates that the operands are two maximally negative fractional numbers.

16. The processor according to claim 15, further comprising a negate logic operable to correct the result output to produce a maximally positive result output.

17. The processor according to claim 16, wherein the control block detects a maximally negative result by examining bits in a set of bits representing the result output.

18. The processor according to claim 17, wherein the examination of the bits in the set of bits is to determine a particular bit combination.

19. The processor according to claim 18, wherein the bits in the set of bits are the two most significant bits in the set of bits representing the result output.

20. The processor according to claim 18, wherein the particular bit combination for the bits in the set of bits representing the result output is one and zero respectively.

21. The processor according to claim 16, wherein the control block generates a control signal.

22. The processor according to claim 21, wherein the control signal is operable to modify a negate control signal.

23. The processor according to claim 22, wherein the negate logic is operable to perform a two's compliment operation on the result output based on the negate control signal.

24. The processor according to claim 23, further comprising:

an accumulator operable to accumulate the maximally positive result output.

25. The processor according to claim 15, further comprising fractionally aligning logic operable to fractionally align the result output.

26. The processor according to claim 25, wherein the fractionally alignment logic shifts a set of bits representing the result output to the left by one bit to discard the most significant bit of the set of bits representing the result output and insert a zero as the least significant bit of the set of bits representing the result output.

27. The processor according to claim 15, further comprising sign extension logic operable to sign extend the result output.

28. The processor according to claim 27, wherein the sign extension logic extends the result output from a 32-bit result to a 40-bit result.

* * * * *